(12) United States Patent
Singh et al.

(10) Patent No.: US 12,386,919 B2
(45) Date of Patent: Aug. 12, 2025

(54) SYNTHETIC DATA GENERATION FOR MACHINE LEARNING MODEL SIMULATION

(71) Applicant: Salesforce, Inc., San Francisco, CA (US)

(72) Inventors: Akash Singh, Gurgaon (IN); Debadri Basak, Kolkata (IN); Mohan Krishna Kusuma, Amalapuram (IN); Rajdeep Dua, Hyderabad (IN); Gowri Shankar Raju Kurapati, Guntur (IN); Shashank Tyagi, Hyderabad (IN)

(73) Assignee: Salesforce, Inc., San Francisco, CA (US)

( * ) Notice: Subject to any disclaimer, the term of this patent is extended or adjusted under 35 U.S.C. 154(b) by 853 days.

(21) Appl. No.: 17/573,585

(22) Filed: Jan. 11, 2022

(65) Prior Publication Data

US 2023/0222178 A1    Jul. 13, 2023

(51) Int. Cl.
*G06N 20/00* (2019.01)
*G06F 3/0482* (2013.01)
*G06F 18/214* (2023.01)
*G06N 5/025* (2023.01)

(52) U.S. Cl.
CPC ........ *G06F 18/2148* (2023.01); *G06F 3/0482* (2013.01); *G06N 5/025* (2013.01); *G06N 20/00* (2019.01)

(58) Field of Classification Search
None
See application file for complete search history.

(56) References Cited

U.S. PATENT DOCUMENTS

| | | |
|---|---|---|
| 10,922,725 B2 | 2/2021 | Mustafi et al. |
| 11,004,236 B2 | 5/2021 | Mustafi et al. |
| 11,037,099 B2 | 6/2021 | Mustafi et al. |
| 11,715,290 B2 | 8/2023 | Mustafi et al. |
| 2019/0122135 A1* | 4/2019 | Parker ................. G06N 5/01 |
| 2020/0090001 A1* | 3/2020 | Zargahi ............... G06F 16/907 |
| 2020/0184278 A1* | 6/2020 | Zadeh .................. G06N 3/044 |
| 2021/0150273 A1 | 5/2021 | Mustafi et al. |
| 2021/0150548 A1 | 5/2021 | Dua et al. |
| 2021/0191908 A1* | 6/2021 | Lott ..................... G06N 20/00 |
| 2021/0192540 A1 | 6/2021 | Madduri et al. |
| 2021/0240967 A1 | 8/2021 | Dua et al. |

OTHER PUBLICATIONS

Datprof, "Synthetic test data generation," downloaded from https://www.datprof.com/solutions/synthetic-test-data-generation/ on Dec. 8, 2021, pp. 1-10.

(Continued)

*Primary Examiner* — Xuyang Xia
(74) *Attorney, Agent, or Firm* — Nicholson De Vos Webster & Elliott LLP

(57) ABSTRACT

A method and system for synthetic data generation are provided that receive a schema configuration file in a synthetic data set request from a client application, create a set of worker processes to generate the synthetic data set based on the schema configuration file, upload the generated synthetic data to an analytics platform, and enable the client application to utilize the generated synthetic data in prediction models for the analytics platform.

21 Claims, 10 Drawing Sheets

(56) References Cited

OTHER PUBLICATIONS

Github, "RealImpactAnalytics/trumania," Apache-2.0 License, downloaded from https://github.com/RealImpactAnalytics/trumania on Dec. 8, 2021, pp. 1-4.

MIT Data ro AI Lab., "SDV—The Synthetic Data Vault," v.0.13.0, Nov. 23, 2021, downloaded from https://sdv.dev/SDV/ on Dec. 8, 2021, pp. 1-2.

* cited by examiner

| # | FEATURE | DATA TYPE | CORRELATION | STRENGTH | CATEGORY VALUE | MEAN | SD | MIN | MAX | Add Row |
|---|---------|-----------|-------------|----------|----------------|------|------|------|------|---------|
| 0 | Enter Name | Type ▼ | Correlation ▼ | Strength ▼ | text | number | number | number | number | 🗐 |
| 1 | Enter Name | Type ▼ | Correlation ▼ | Strength ▼ | text | number | number | number | number | 🗐 |
| 2 | Enter Name | Type ▼ | Correlation ▼ | Strength ▼ | text | number | number | number | number | 🗐 |
| 3 | Enter Name | Type ▼ | Correlation ▼ | Strength ▼ | text | number | number | number | number | 🗐 |
| 4 | Enter Name | Type ▼ | Correlation ▼ | Strength ▼ | text | number | number | number | number | 🗐 |
| 5 | Enter Name | | | | | | | | | |

Make Your Wish

Back    Create Dataset

FIG. 4A

| SUBSCRIPTION ID | SUBSCRIPTION START DATE | NAME | TENURE (MONTHS) | CLTV | LAST 30 DAYS SPEND TREND | LAST 30 DAYS DATA USAGE TREND | TOPUP FREQUENCY TREND | DUMMY_CATEGORY | SUBSCRIPTION TYPE | CHURNED |
|---|---|---|---|---|---|---|---|---|---|---|
| AABK4940824289799 | 26/01/20 | DEANNA WHITE | 14 | 0 | 15.1 | 1.13 | -44.16 | Status2 | SILVER | ACTIVE |
| KKZF7336210939470 | 02/05/19 | SUSAN NORMAN DVM | 25 | 0 | 11.2 | 6.17 | -48.02 | Status2 | GOLD | ACTIVE |
| MJYG9938452899543 | 18/02/18 | JOSHUA BENNETT | 28 | 0 | 0.89 | 13.13 | -24.8 | Status1 | GOLD | ACTIVE |
| RFDW01639983861285 | 15/04/18 | SEAN YOUNG | 3 | 0 | -12.7 | 13.12 | -57.86 | Status3 | SILVER | ACTIVE |
| DHSA6738554683416 | 15/04/18 | JOHN ERICKSON | 2 | 0 | -0.4.86 | 5.5 | -46.55 | Status2 | GOLD | INACTIVE |

FIG. 4B

SYNTHETIC DATA GENERATION FOR MACHINE LEARNING MODEL SIMULATION

TECHNICAL FIELD

One or more implementations relate to the field of machine learning; and more specifically, to the generation of training data sets for training machine learning models.

BACKGROUND ART

Machine learning (ML) algorithms can be deployed in many operational contexts for various purposes including image recognition, computer resource usage prediction, managing the operations of telecommunications networks, and similar cases where patterns in training data that correlate with known outcomes or actions can be identified. ML algorithms can be deployed in many operational environments including in user applications. User can design and deploy ML models that provide predictions or analysis for the users of the applications where the applications can manage inventory, customer relations, financial transactions, healthcare recommendations, and applications for similar operational contexts. Due to the large data sets required to create and train accurate ML models, and the large amount of data collection required to generate training data that can produce accurate ML models it can be difficult for developers to properly train the ML models that are designed.

One of the biggest challenges in the ML development and adoption process is the lack of availability of suitable training datasets for building and training ML models. Certain use cases require very specific labeled numerical datasets. Such datasets can be scarce, small, or not available publicly. This lack of robust training data severely limits innovation and experimentation by data scientists and machine learning practitioners. Some examples of industrial ML use cases include predicting subscriber churn for telecommunications networks, predictions of out of stock inventory for retailers or warehouses, and fraudulent transaction prediction for payments and recommending healthcare providers. There are various reasons for the scarcity of datasets for these contexts. These datasets contain information about an organization's day to day internal operations and thus, the organizations can be reluctant to share this data with other organizations such that a robust dataset can be generated. There are often legal issues and privacy concerns with sharing collected data especially in certain fields like financial services and health care. For some use cases, there is simply no data at all. Without real world data to be used as a basis for training data sets, synthetically generated data can be utilized.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 4A is a diagram illustrating a user interface for synthetic data generation according to some example implementations.

FIG. 4B is a diagram of a data set according to the example schema.

DETAILED DESCRIPTION

Figure 1:
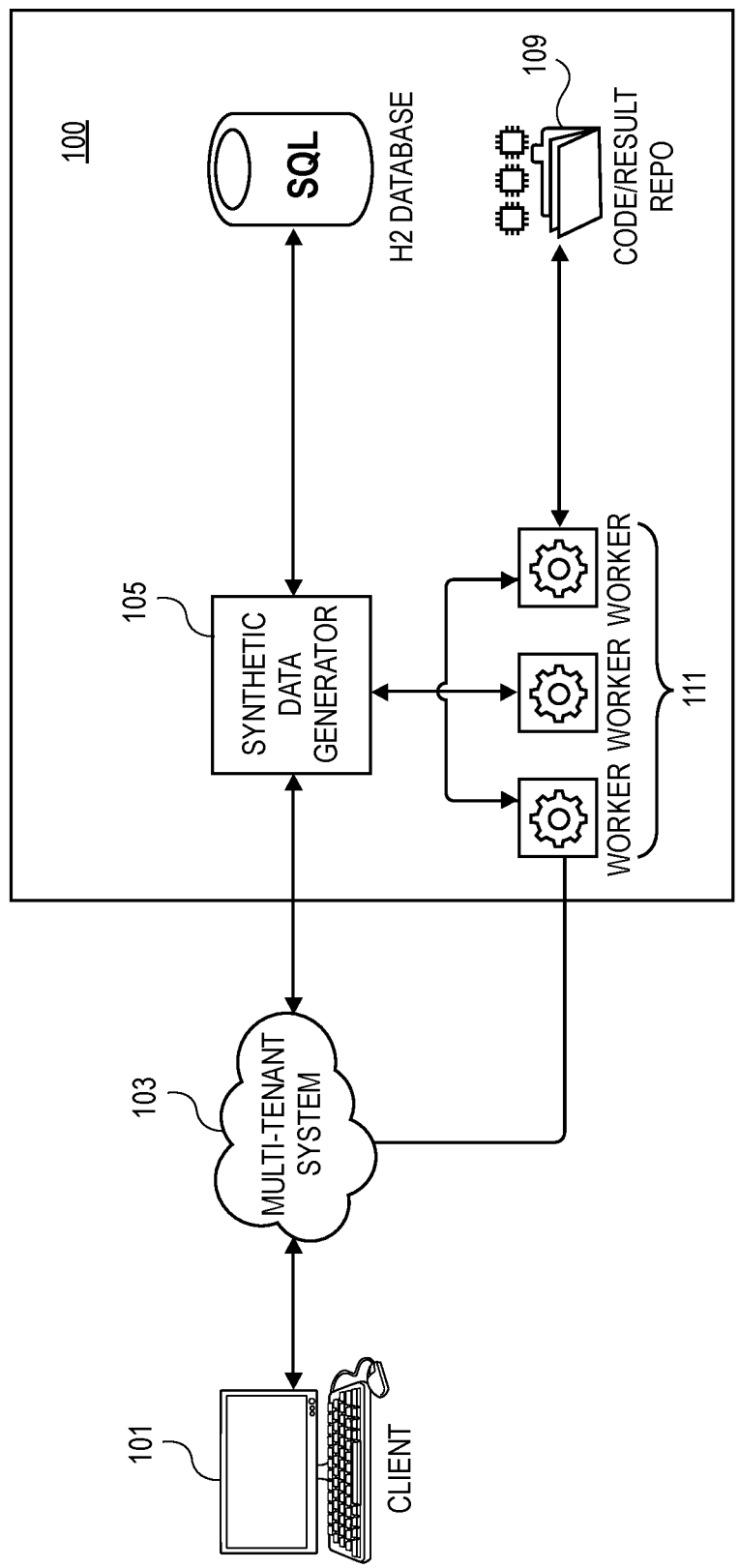
FIG. 1 is a block diagram illustrating the synthetic data generation architecture according to some example implementations.

The following description describes implementations for a synthetic data generator. The synthetic data generator is a part of a guided tool for generating machine learning (ML) datasets for training ML models for different scenarios using prior knowledge defined by the user via the guided tool. The synthetic data generation system enables developers, programmers, project managers, and similar users to generate data for ML models that are being developed and, in some cases, integrated into applications. The synthetic data generation system can facilitate the building of recipes for synthetic data (e.g., exact, transform, load (ETL) recipes for ETL tools such as those offered by Salesforce.com, Inc.), demonstration programs, and other similar scenarios.

The synthetic data generation system provides support for different statistical distributions, correlations between input and target variables, data formats, data constraints, and entity relationships. The synthetic data generation system provides an end to end solution for generating synthetic data and making it available for ML model training in a development environment (e.g., as opposed to a code or script that requires programming knowledge for synthetic data generation). The synthetic data generation system includes a guided user interface (UI) that can be integrated into a ML platform (e.g., Einstein Analytics by Salesforce.com) as opposed to code or scripts that must be modified and executed as a separate endeavor to generate a training data set.

The synthetic data generation system can be utilized by domain experts with applicable industry knowledge. Industry experts can design the data sets using domain knowledge as a data schema that the synthetic data generation system can process to generate the ML ready data sets (i.e., data sets that are ready for use in training a set of ML models). A 'set,' as used herein can refer to any positive whole number of items including one item. ML ready datasets can be generated that are able to handle Input/Output relationships as well as formats for individual columns. Trained models can use these ML ready datasets which include a set of patterns specified in data schema.

The synthetic data generation system can include a rule engine to convert the input-output relationship specification of the input data schema into if-else rules. The synthetic data generation system can use linear programming to further shape data in the generated synthetic data sets as per the specified patterns. The synthetic data generation system can support and process an expressive and flexible data schema language. The data schema language can be utilized to encode many real world patterns. The data schema language can have a platform agnostic specification through (YAML-YAML Ain't Markup Language). The data schema language can be extended to cover more use cases over time.

The data generation system architecture can be used in support of machine learning including deep learning system. Many ML models are developed on the basis of the availability of huge image and text datasets in various fields that have spurred the development an application of various ML models. These ML models have been a part of complex and big ML model architectures that have achieved state of the art results in the fields of computer vision, image recognition, and natural language processing (NLP).

However, the success of ML models in these fields has not extended all other domains. The synthetic data generation system addresses one of the biggest challenges in ML model development and application across different domains by addressing the lack of availability of suitable datasets for building and training ML models for these domains. Some domains require very specific labeled numerical datasets to generate appropriate ML models or have other specific requirements for the requisite patterns of the dataset to be discernable by an ML model. The available datasets for many domains can be too small, not publicly shared, or simply non-existent.

The synthetic data generation system provides a solution for this problem by generating the training data that is needed for these cases under the guidance of a knowledgeable user. There are several practical challenges in generating ML ready synthetic datasets. Generating new datasets from scratch without a method for generating realistic data would result in random data, e.g., data generated from an initial seed value of from an initial seed database that is then used to generate more data. Such unstructured data generation can be described as 'garbage in, garbage out.' It is straightforward to generate random datasets that do not have any patterns. However, an ML model is as good as the dataset it is trained on. If the training dataset does not have any meaningful patterns to learn that correlate with realistic patterns for the case, then the resulting ML model is of no use as it will generate random predictions. Synthetic data generation requires technical expertise and is often done by technical users like software engineers or data scientists.

However, to have useful datasets and ML models, it is important to incorporate domain expertise and domain knowledge in the data generation process. This domain knowledge is available from domain expert users like product managers, subject matter experts, and analysts. The synthetic data generation system is a tool to generate ML ready synthetic datasets targeted towards specific domains. The synthetic data generation system enables subject matter experts (SMEs) to incorporate the domain and business knowledge acquired over the years in the data generation process. Any relationships or patterns that are deemed important for the ML model to learn can be added to the datasets. This allows the SMEs to build ML models that can pick real world patterns and test the models for different real world scenarios. The SMEs can control the strength of Input/Output relationships that have a direct effect on the accuracy of the model. In some implementations, these generated datasets are made available as special data sets within an analytics platform (e.g., Einstein Analytics Datasets within Salesforce.com organizations), to allow for rapid model development and experimentation.

The synthetic data generation system can generate synthetic datasets that support classification and regression use cases. The synthetic data generation system has the ability to control the accuracy of the ML model to be trained by defining the correlation and strength of each variable to a target variable. The synthetic data generation system enables generating meaningful names, cities, identifiers, and many data types that give the appearance of real data. The synthetic data generation system can support direct integration with multi-tenant platforms and analytics platforms. The synthetic datasets that are generated are not of the same quality as real world data. Instead, the synthetic datasets approximate real data with and are as good as the domain knowledge incorporated by the designer. The synthetic data generation system enables the development of ML models, testing of hypothesis, and quick experimentation even in use cases where real datasets for training ML models are inadequate or unavailable.

FIG. 1 is a block diagram of a synthetic data generation system architecture. The synthetic data generation system 100 can support a set of clients 101, applications and services in a multi-tenant system 103. The clients 101 can be any combination of applications executing on any type of client device. Any number and variety of clients 101 can be connected to the multi-tenant system 103. In other implementations, the clients 101 can directly interface with the synthetic data generation system 100 or can interface with the synthetic data generation system 100 via other intermediate systems. The client applications of the clients 101 can operate in conjunction with services and servers in the multi-tenant system 103 or similar intermediate system.

The multi-tenant system 103 can be any type or combination of applications and services that are hosted by a cloud architecture or similar computing environment. The applications and services can be instances that are shared by multiple tenants (i.e., organizations) that subscribe to the services of the multi-tenant system 103. In other implementations, other intermediate systems such as other types of cloud computing environments, hosted or centralized services, edge services in a telecommunication network, or similar intermediate systems can interface between the clients 101 and the synthetic data generation system 100.

The synthetic data generation system 100 can include a synthetic data generator 105, a database 107, a set of workers 111, a code or result repository 109, and similar components. This set of components is provided by way of example and not limitation. Any combination of these components can be separate from the synthetic data generation system 100 or the functions thereof can be interchangeable.

The synthetic data generation system and/or the components thereof can be implemented in the Python programming language, implemented in similar programming languages or combinations thereof. In one example implementation, the synthetic data generation system is hosted as a Django web application (or similar web framework) on a Heroku server or similar cloud platform.

The synthetic data generation system 100 receives a data schema or similar configuration file from the client application 101 or multi-tenant system 103. The synthetic data generation system 100 parses the data schema to generate the synthetic dataset. In some implementations, Python libraries including the python data analysis library (pandas), NumPy (an array and matrix function library), are used to generate data. Data generation can be specified completely or partially by the schema configuration file.

Figure 2:
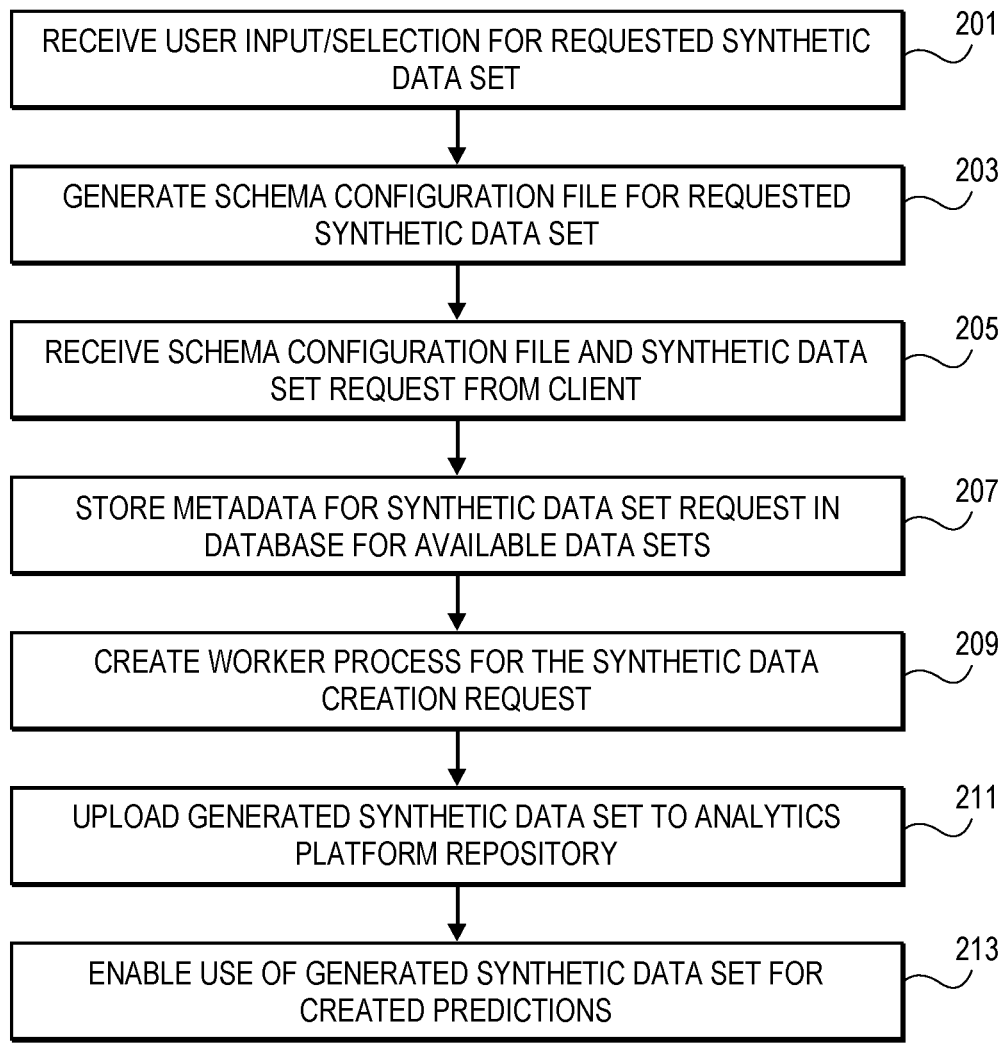
FIG. 2 is a flow diagram illustrating a workflow process for synthetic data generation according to some example implementations.

FIG. 2 is a flowchart of one example of the workflow of the synthetic data generation system according to some implementations. The operation of the synthetic data generator 105 can be triggered by receiving a data schema configuration that defines a requested dataset (Block 201). The request for the dataset can be received from a client application. A user can be guided to define the requested data set by a user interface (UI) of the client application. In some implementations, the UI at the client application is entirely local to the client device (i.e., executed from code in the client application), whereas in other implementations the guided UI is generated by the synthetic data generation system and provided to the client application for display as a UI.

The user completes the guided UI for the design of the requested dataset and the inputs entered by the user are captured and organized as a data schema configurations file (Block 203). The generated data schema configuration file can then be sent (e.g., using a POST request) to synthetic data generation system 100 where the submitted data schema configuration is accepted as an input by the synthetic data generator 105 (Block 205). Different data generation scripts can be stored in the local filesystem 109 of the synthetic data generation system 100.

In some implementations, users and client applications can upload custom scripts to be executed by the synthetic data generator 105. For each dataset request, metadata can be persisted in a database 107 (Block 207). The database 107 can be a relational database that supports structured query language (SQL) requests. For each request, a data generation job is created by the synthetic data generator 105 as a worker process or similar job to be executed by job processing subsystem 111 or similar system within a host environment (Block 209). The job processing subsystem 111 can return a job identifier to the synthetic data generator 105. In some implementations, the job processing subsystem 111 can be a part of the synthetic data generation system 100. In other implementations, the job processing subsystem 111 is provided by a host operating environment.

Once the job execution is over, the generated synthetic dataset is uploaded to the analytics platform and/or the multi-tenant platform repositories 109 (Block 211). In an example implementation provided by Salesforce.com, the generated synthetic datasets are uploaded or stored to the Tableau customer relations management (TCRM) Einstein Analytics platform using the Salesforce organization credentials (i.e., tenant credentials) provided with the initial synthetic dataset request. In other implementations, the generated dataset is uploaded to an analytics platform, multi-tenant platform, server, or similar operating environment where a backend of the client application executes. The uploaded generated synthetic dataset can then be enabled for use in training ML models for the client application (Block 213).

In some implementation, once the generated synthetic dataset is available in backend system (e.g., in Einstein Analytics for a Salesforce.com system), an ML model can be generated based on the synthetic data set and the applied in the functions of the client application (e.g., to create predictive stories). The ML model predictions can be inline with the patterns specified in the data schema configuration file.

Figure 3A:
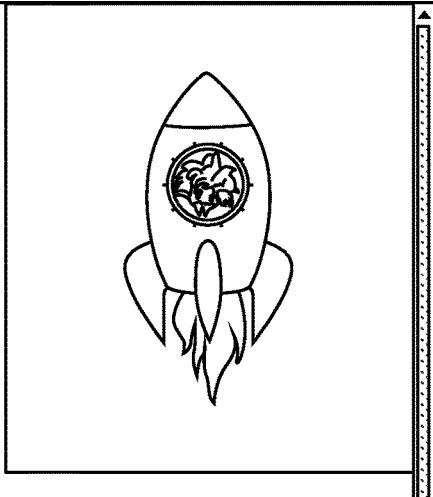
FIG. 3A is a diagram illustrating a user interface for synthetic data generation according to some example implementations.

FIG. 3A is a diagram of one example of a guided user interface for generating synthetic data according to some implementations. In some implementations, the guided UI is implemented using lightning web components (LWC) and Aura components in Salesforce Core. The guided UI can have any number or organization of screens that enable the collection of the requisite data for generating the data schema configuration. In one example implementation, the guided UI has three primary screens, a setup page, a schema definition page, and a job status page.

The initial guided UI interface can be the setup page. The setup page is illustrated in FIGS. 3 and 4. The setup page can have the following functions, defining a dataset name, defining a model type, and defining the target variables and labels. The illustrated guided UI of FIG. 3A includes a field to specify the dataset name 301. In other implementations, the name can be automatically generated. Any name or description can be given to the dataset to be generated. In some implementations, the name can be supplemented or used to derive a unique identifier to differentiate the dataset in the operating environment.

Similarly, the guided user interface can include a field to specify a name of a target variable 303. A 'target variable' of a dataset is a feature of a dataset for which an ML model is trained to identify patterns and to generate predictions. The dataset includes input features correlated with values of the target variable from which the patterns and tendencies of the target variable can be determined by the ML model.

The ML model type 305 can be selected from a set of possible model types including classification, and regression models. Regression models can be utilized to predict continuous values (e.g., variables that have an uninterrupted range such as salary, bandwidth, processor usage, or similar target variables). In contrast, classification models can be utilized to determine a category or a discrete value from a set of possible values (e.g., classifying animals as male or female, email as spam or not spam, or similar classifications).

In the guided UI, the characteristics 307 of the target variable can be defined including a mean, and standard deviation for the target variable. Similarly, the upper and lower bounds of a range for the target variable can be specified. Any further characteristics of the data can also be specified that are consistent with a regression ML model.

Figure 3B:
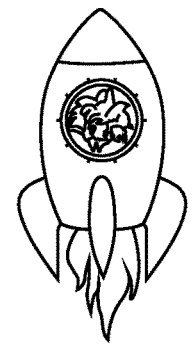
FIG. 3B is a diagram of one example of the guided UI according to some implementations.

FIG. 3B is a diagram of one example of the guided UI according to some implementations. In this example implementation, the model type 355 is a binary classification model. The binary classification model selection prompts the display of a different set of characteristics 357 associated with the classification model 357. In the example implementation, the labels for outcomes can be identified with the identification of a positive and a negative label. The positive and negative labels 407 in the example denote the two classes of labels in binary classification. For example, in predicting churn, the positive label is "churned" and the negative label is "not churned." For an ad click prediction classification, the positive class can be "clicked," and the negative class can be "not clicked."

In some implementations, these data characteristics are separated out into a separate schema definition page. The data schema definition page can be used to specify the data schema. The schema definition page can enable the collection of feature names, feature types (e.g., Numeric, Categorical, Date, Name, City, or similar types), and similar feature characteristics. Additional characteristics can include constraints such as min/max values. The scheme definition page can also include interfaces to collect distribution parameters including mean and standard deviation for numerical features, and category value and weight for categorical variables. The data schema definition page can also enable the user to define relationship parameters between the target variable and the outcomes including correlation type, and correlation strength.

In some implementations, the correlation type can have one of a set of values including positive, negative, or neutral values. Positive values specify positive correlation between the input and target variables. Negative values specify a negative correlation between the input and target variables. Neutral or (missing) values specify no correlation between the input and target variables. The correlation strength can take the values: high, medium, low which denote the degree of positive/negative correlation between the input and output variables. FIG. 4A is a diagram of one example user interface for defining the correlation type and strength information for a requested data set according to some implementations.

The third page type can be a job status page. The job status page notifies the user of the status of the synthetic data generation job. When the data schema definition has been sent to the synthetic data generation system, then the synthetic data generation system will respond with job information updates including that the job has been received, the job is being processed, the job has completed, and similar updates. In some implementations, the status can specify that the job has been submitted, the job was successful, or that certain errors have been encountered.

In some implementations, a data schema language is defined using YAML or similar tools or languages. The data schema configuration file can completely or partially specify the dataset to be generated. In some implementations, a flexible and expressive data schema language (DSL) is implemented in YAML for defining data schemas. The DSL can encode many real world data formats, patterns, and relationships. The DSL is platform agnostic and is kept open and extensible to support more types of patterns, use cases, and relationships in future expansions or applications.

A sample data schema is shown and commented below. This schema defines how to generate data for modeling customer churn for prepaid mobile subscriptions. The schema defines Subscription Id, Subscription Start Date, Tenure, Customer Lifetime value (CLTV), Spend Trend, Data Usage Trend, Topup Frequency as the input features, which can be used to predict the target variable. Target variable is specified as Churned and can take values Inactive/Active denoting whether a customer will churn or not.

```
    n_samples: 100 {number of data samples to generate
    output_file: data/churn_dataset.csv {name of output file in
csv format
    schema:
      features:
        SubscriptionId:
          type: id
          format: bban
        Subscription Start Date:
          type: date
          start_date: 2017-01-01
          end_date: 2020-12-31
        Name:
          type: name
        Tenure (Months):
          type: int
          min: 3
          max: 100
          buckets:
            mean: 16
            std: 8
            correlation: positive
            strength: high
        CLTV:
          type: int
          min: 0
          max: 5000
          buckets:
            mean: -40
            std: 20
        Last 30 Days Spend Trend:
          type: float
          buckets:
            mean: 10
            std: 5
            correlation: positive
            strength: high
            proportion: 0.5
            mean: -10
            std: 5
            correlation: negative
            strength: high
            proportion: 0.5
        Last 30 Days Data Usage Trend:
          type: float
          buckets:
            mean: 10
            std: 5
        Topup Frequency Trend:
          type: float
          buckets:
            mean: -40
            std: 20
            correlation: positive
            strength: high
        Dummy_Category:
          type: category
          cats:
            Status1:
            Status2:
            Status3:
        Subscription Type:
          type: category
          cats:
            Gold:
              proportion: 0.5
              correlation: positive
              strength: high
            Silver:
              proportion: 0.3
              correlation: positive
              strength: medium
            Bronze:
              proportion: 0.2
              correlation: negative
              strength: low
      target:
        Churned:
          type: category
          cats:
            Active:
              proportion: 0.9
            Inactive:
              proportion: 0.1
```

The sample schema will generate csv file with 100 rows stored in location "data/churn_dataset.csv." A sample of the dataset is shown in FIG. 4B. The resulting dataset has the input features and the target variable along with the desired patterns. It can then be directly used for training a churn prediction model.

Figure 5:
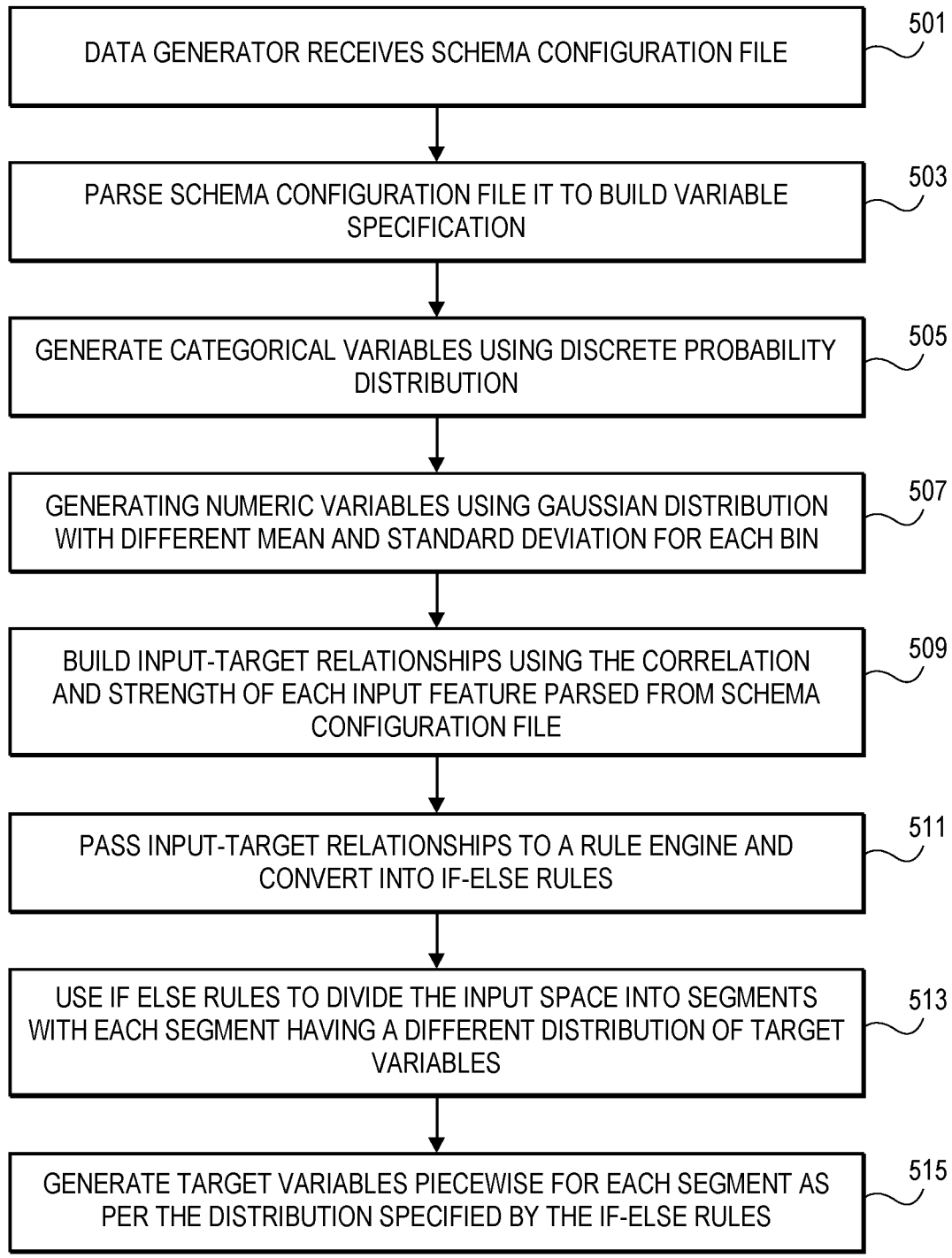
FIG. 5 is a flow diagram illustrating a data generation process according to some example implementations.

FIG. 5 is a flowchart of one example of the process of the synthetic data generator according to some implementations. The synthetic data generator 105 in the synthetic data generation system 100 can process the data schema configuration file and manage the generation of the synthetic dataset. The synthetic data generator 105 can be initiated by receiving the data schema configuration file from the client application or similar source (Block 501). The synthetic data generator can parse the data schema configuration file to build a variable specification for the dataset to be generated (Block 503). In cases where the target variables are categorical variables or the other input variables in the data set are categorical, then a set of categorical variables are generated using discrete probability distribution with proportions (Block 505). In some implementations, the set of categorical variables can be expressed as:

$$f(x=i)=p_i$$

where $p_i \in (p_1, p_2, \ldots p_k)$ is the probability of category i

In cases where the target variables are numeric variables or where other variable in the requested dataset are numeric, then the synthetic data generator 105 generates numeric variables using Gaussian distribution with different mean and standard deviation for each bin (Block 507). The equation for the Gaussian distribution of the variables can be given by $$f(x=i)=[N(\mu_1,\sigma_1), N(\mu_2,\sigma_2), \ldots N(\mu_k,\sigma_k)] \text{ where}$$

$\mu_i$, $\sigma_i$ are the mean and standard deviation of the i-th bin

The synthetic data generator then builds input-target relationships, i.e., generates the data that correlates the outcome with the target variables (Block 509). The input-target relationships can be derived from the correlation and strength of each input feature that is parsed from the data schema configuration. This information is passed to a rule engine and converted into if-else rules (Block 511). The if-else rules can be used to divide the input space into segments with each segment having a different distribution of the target variable (Block 513). Target variable is then piecewise generated for each segment as per the distribution specified by the if-else rules (Block 515). The resulting dataset can then be output by the synthetic data generator to be uploaded as discussed in relation to the workflow of the synthetic data generation system.

Figure 6:
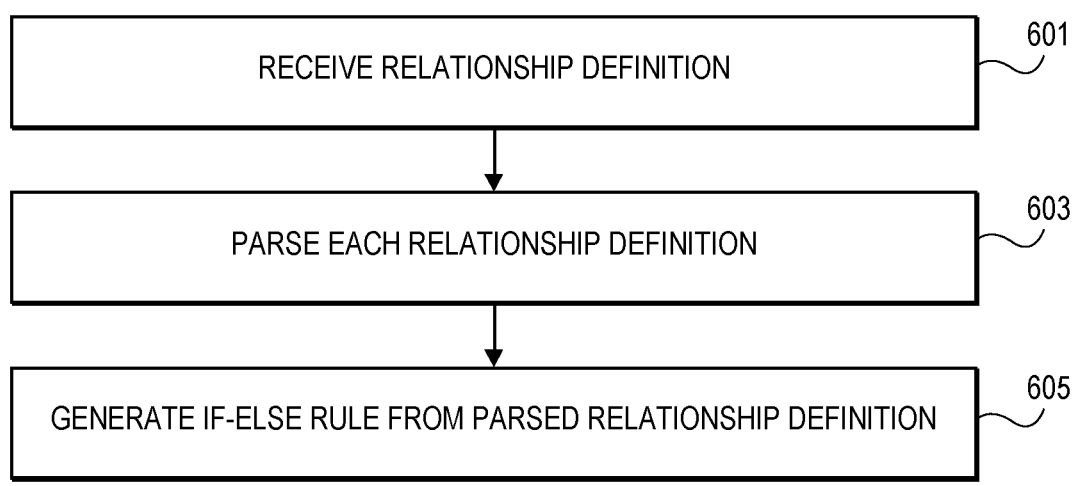
FIG. 6 is a flow diagram illustrating a data generation process according to some example implementations.

FIG. 6 is a flowchart of one example of the operation of a rule engine according to some implementations. The rule engine can be a component of the synthetic data generator or similar component of the synthetic data generation system. A rule engine is developed to convert the relationship definitions into if-else rules. The relationship definitions specify the correlation type and strength between different features. Further each category or bin of the variable can define separate relationships. Upon receipt of the relationship definitions (Block 601), all relationships definitions are parsed (Block 603), and converted to if-else rules (Block 605). The if else rules are then applied to generate the target variable for each segment. A sample relationship definition and the corresponding if-else rule is shown below:

```
SAMPLE SPECIFICATION
Customer Tenure (Months):
 type: integer
 min: 3
 max: 100
 buckets:
 - mean: 48
   std: 12
   correlation: negative
   strength: high
```

```
- mean: 6
  std: 3
  correlation: positive
  strength: medium
Plan Type:
 type: category
 cats:
 - Gold:
   proportion: 0.3
   correlation: negative
   strength: high
 - Bronze:
   proportion: 0.5
   correlation: positive
   strength: high
-----------------------------------------------------
GENERATED RULES
if tenure_months >= 36 and tenure <=60 and plan_type=="
   then churn_probability = 0.2
else if tenure <= 6 and plan_type=="Bronze":
   then churn_probability = 0.8
```

In some implementations, the synthetic data generation system is developed as a web service in Spring Boot. REST APIs can be provided to trigger jobs that can spawn new processes and execute uploaded code without interrupting the main server. Thus, it enables concurrent execution of multiple requests.

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 7A:
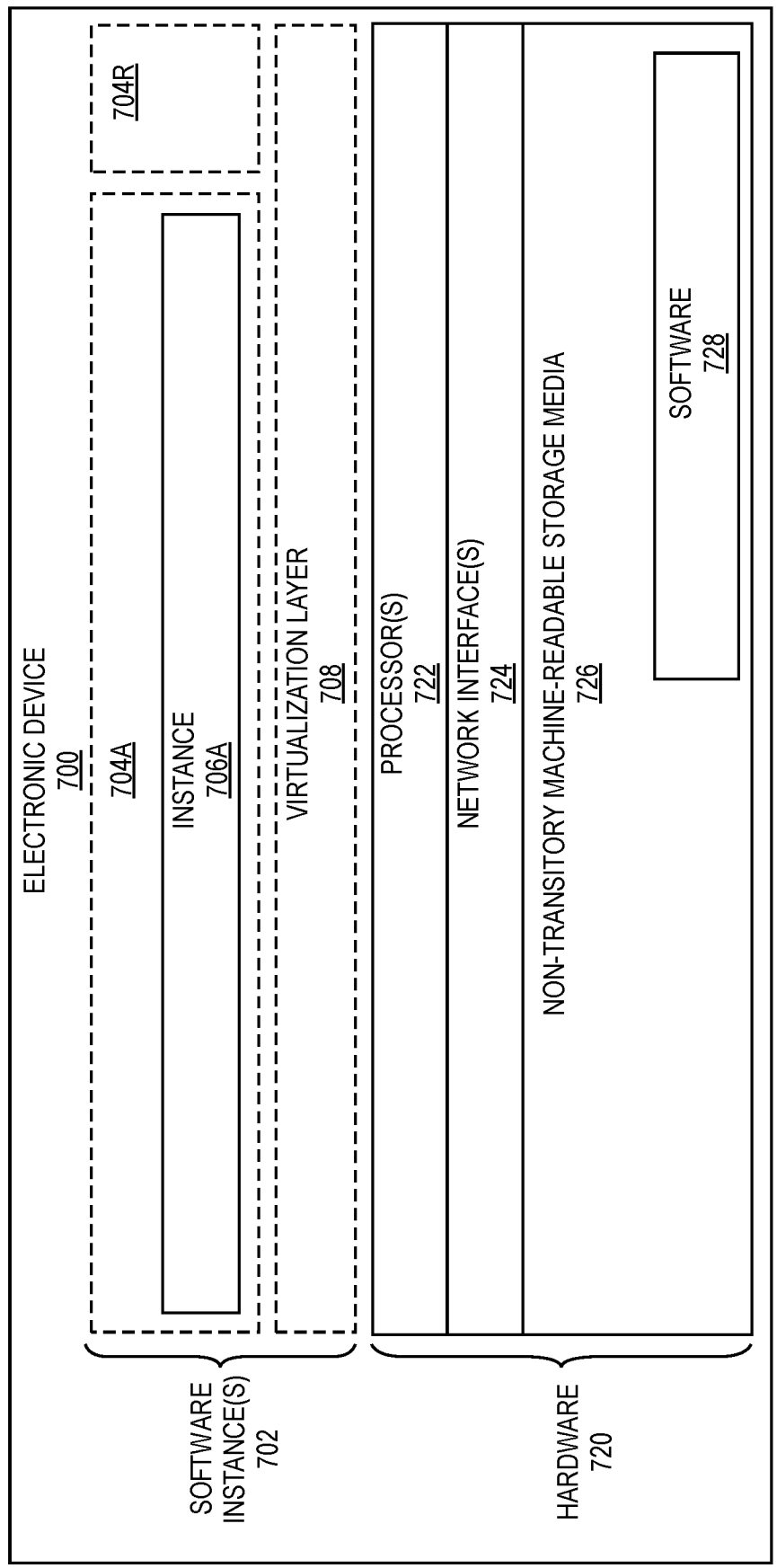
FIG. 7A is a block diagram illustrating an electronic device according to some example implementations.

FIG. 7A is a block diagram illustrating an electronic device 700 according to some example implementations. FIG. 7A includes hardware 720 comprising a set of one or more processor(s) 722, a set of one or more network interfaces 724 (wireless and/or wired), and machine-readable media 726 having stored therein software 728 (which includes instructions executable by the set of one or more processor(s) 722). The machine-readable media 726 may include non-transitory and/or transitory machine-readable media. Each of the previously described clients and the synthetic data generation service may be implemented in one or more electronic devices 700. In one implementation: 1) each of the clients is implemented in a separate one of the electronic devices 700 (e.g., in end user devices where the software 728 represents the software to implement clients to interface directly and/or indirectly with the synthetic data generation service (e.g., software 728 represents a web browser, a native client, a portal, a command-line interface, and/or an application programming interface (API) based upon protocols such as Simple Object Access Protocol (SOAP), Representational State Transfer (REST), etc.)); 2) the synthetic data generation service is implemented in a separate set of one or more of the electronic devices 700 (e.g., a set of one or more server devices where the software 728 represents the software to implement the synthetic data generation service); and 3) in operation, the electronic devices implementing the clients and the synthetic data generation service would be communicatively coupled (e.g., by a network) and would establish between them (or through one or more other layers and/or or other services) connections for submitting data generation requests to the synthetic data generation service and returning the requested dataset or confirmation of its availability to the clients. Other configurations of electronic devices may be used in other implementations (e.g., an implementation in which the client and the synthetic data generation service are implemented on a single one of electronic device 700).

During operation, an instance of the software 728 (illustrated as instance 706 and referred to as a software instance; and in the more specific case of an application, as an application instance) is executed. In electronic devices that use compute virtualization, the set of one or more processor(s) 722 typically execute software to instantiate a virtualization layer 708 and one or more software container(s) 704A-704R (e.g., with operating system-level virtualization, the virtualization layer 708 may represent a container engine (such as Docker Engine by Docker, Inc. or rkt in Container Linux by Red Hat, Inc.) running on top of (or integrated into) an operating system, and it allows for the creation of multiple software containers 704A-704R (representing separate user space instances and also called virtualization engines, virtual private servers, or jails) that may each be used to execute a set of one or more applications; with full virtualization, the virtualization layer 708 represents a hypervisor (sometimes referred to as a virtual machine monitor (VMM)) or a hypervisor executing on top of a host operating system, and the software containers 704A-704R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 728 is executed within the software container 704A on the virtualization layer 708. In electronic devices where compute virtualization is not used, the instance 706 on top of a host operating system is executed on the "bare metal" electronic device 700. The instantiation of the instance 706, as well as the virtualization layer 708 and software containers 704A-704R if implemented, are collectively referred to as software instance(s) 702.

Alternative implementations of an electronic device may have numerous variations from that described above. For example, customized hardware and/or accelerators might also be used in an electronic device.

Example Environment

Figure 7B:
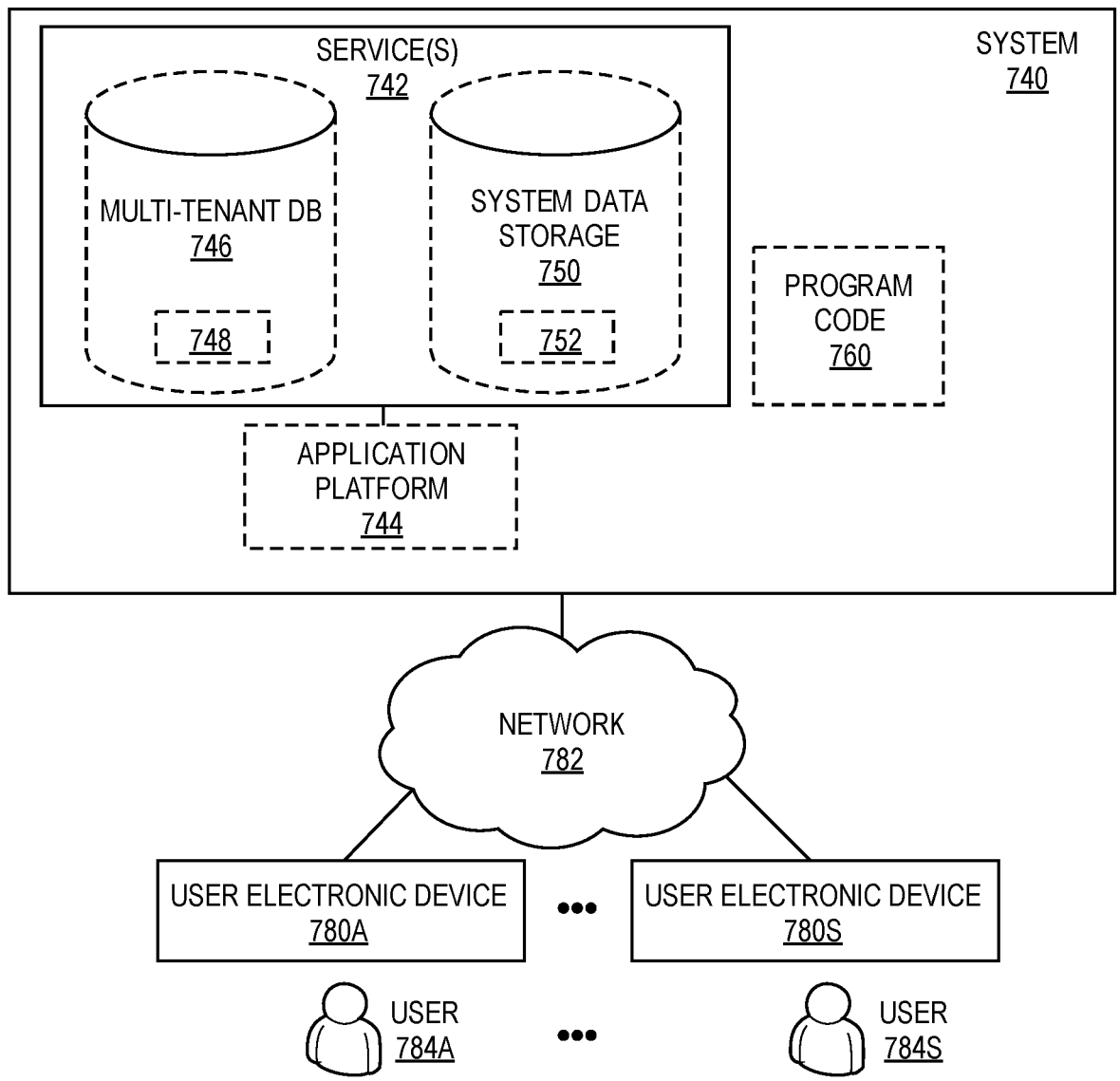
FIG. 7B is a block diagram of a deployment environment according to some example implementations.

FIG. 7B is a block diagram of a deployment environment according to some example implementations. A system 740 includes hardware (e.g., a set of one or more server devices) and software to provide service(s) 742, including the synthetic data generation service. In some implementations the system 740 is in one or more datacenter(s). These datacenter(s) may be: 1) first party datacenter(s), which are datacenter(s) owned and/or operated by the same entity that provides and/or operates some or all of the software that provides the service(s) 742; and/or 2) third-party datacenter(s), which are datacenter(s) owned and/or operated by one or more different entities than the entity that provides the service(s) 742 (e.g., the different entities may host some or all of the software provided and/or operated by the entity that provides the service(s) 742). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 740 is coupled to user devices 780A-780S over a network 782. The service(s) 742 may be on-demand services that are made available to one or more of the users 784A-784S working for one or more entities other than the entity which owns and/or operates the on-demand services (those users sometimes referred to as outside users) so that those entities need not be concerned with building and/or maintaining a system, but instead may make use of the service(s) 742 when needed (e.g., when needed by the users 784A-784S). The service(s) 742 may communicate with each other and/or with one or more of the user devices 780A-780S via one or more APIs (e.g., a REST API). In some implementations, the user devices 780A-780S are operated by users 784A-784S, and each may be operated as a client device and/or a server device. In some implementations, one or more of the user devices 780A-780S are separate ones of the electronic device 700 or include one or more features of the electronic device 700.

In some implementations, the system 740 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 740 is a multi-tenant cloud computing architecture supporting multiple services, such as one or more of the following types of services: Synthetic Data Generation (e.g., as part of an analytics platform), Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 740 may include an application platform 744 that enables PAAS for creating, managing, and executing one or more applications developed by the provider of the application platform 744, users accessing the system 740 via one or more of user devices 780A-780S, or third-party application developers accessing the system 740 via one or more of user devices 780A-780S.

In some implementations, one or more of the service(s) 742 may use one or more multi-tenant databases 746, as well as system data storage 750 for system data 752 accessible to system 740. In certain implementations, the system 740 includes a set of one or more servers that are running on server electronic devices and that are configured to handle requests for any authorized user associated with any tenant (there is no server affinity for a user and/or tenant to a specific server). The user devices 780A-780S communicate with the server(s) of system 740 to request and update tenant-level data and system-level data hosted by system 740, and in response the system 740 (e.g., one or more servers in system 740) automatically may generate one or more Structured Query Language (SQL) statements (e.g., one or more SQL queries) that are designed to access the desired information from the multi-tenant database(s) 746 and/or system data storage 750.

In some implementations, the service(s) 742 are implemented using virtual applications dynamically created at run time responsive to queries from the user devices 780A-780S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 760 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 744 includes an application setup mechanism that supports application developers' creation and management of applications, which can be saved as metadata by save routines. Invocations to such applications, including the synthetic data generation service, can be coded using Procedural Language/Structured Object Query Language (PL/SOQL) that provides a programming language style interface. Invocations to applications can be detected by one or more system processes, which manages retrieving application metadata for the tenant making the invocation and executing the metadata as an application in a software container (e.g., a virtual machine).

Network 782 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4th generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 740 and the user devices 780A-780S.

Each user device 780A-780S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 740. For example, the user interface device can be used to access data and applications hosted by system 740, and to perform searches on stored data, and otherwise allow one or more of users 784A-784S to interact with various GUI pages that may be presented to the one or more of users 784A-784S. User devices 780A-780S might communicate with system 740 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 780A-780S might include an HTTP client, commonly referred to as a "browser," for sending and receiving HTTP messages to and from server(s) of system 740, thus allowing users 784A-784S of the user devices 780A-780S to access, process and view information, pages and applications available to it from system 740 over network 782.

CONCLUSION

In the above description, numerous specific details such as resource partitioning/sharing/duplication implementations, types and interrelationships of system components, and logic partitioning/integration choices are set forth in order to provide a more thorough understanding. The invention can be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method comprising:
   receiving, at a synthetic data generation system, a schema configuration file in a synthetic data set request from a client application, wherein the schema configuration file defines a plurality of input features and a target variable to be generated for each item in a synthetic data set, wherein the schema configuration file includes feature characteristics for each of the plurality of input features, wherein the schema configuration file includes a set of one or more distribution parameters for a first input feature of the plurality of input features, wherein the schema configuration file includes a set of one or more correlations between the first input feature and the target variable for each item in the synthetic data set;
   generating, by the synthetic data generation system, a plurality of items for the synthetic data set based on the schema configuration file by performing the following for the plurality of items:
      generating synthetic data for the plurally of input features based on the feature characteristics and the set of one or more distribution parameters included in the schema configuration file;
      generating a set of one or more if-then else rules based at least on the set of one or more correlations, wherein the set of one or more if-then else rules express how the synthetic data generated for the first input feature should effect generation of synthetic data for the target variable; and
      generating synthetic data for the target variable based at least on the synthetic data generated for the first input feature and the set of one or more correlations between the first input feature and the target variable included in the schema configuration file, wherein generating the synthetic data for the target variable includes applying at least one of the set of one or more if-then else rules; and
   training a machine learning model (ML) using the generated synthetic data.

2. The method of claim 1, the generating the synthetic data for the plurally of input features comprising:
   generating, based on one of the feature characteristics for at least one of the plurality of input features, the synthetic data using discrete probability distribution.

3. The method of claim 1, further comprising:
   building a set of one or more input to target relationships using the set of one or more correlations, wherein each of the set of one or more correlations includes a correlation type and a correlation strength.

4. The method of claim 1, further comprising:
   generating the set of if-else rules from input to target relationships derived from the schema configuration file.

5. The method of claim 4, wherein the set of if-else rules divide an input space into segments with respective distributions.

6. The method of claim 5, the generating the synthetic data for the target variable comprising:
   generating the synthetic data per the respective distributions.

7. The method of claim 1, wherein each of the set of one or more correlations is expressed in the schema configuration files using a correlation type and a correlation strength, wherein the correlation type expresses an effect on synthetic data to be generated for the target variable, and wherein the correlation strength expresses a magnitude of the effect.

8. A non-transitory machine-readable storage medium that provides instructions that, when executed by a set of one or more processors, are configurable to cause the set of one or more processors to perform operations comprising:
   receiving, at a synthetic data generation system, a schema configuration file in a synthetic data set request from a client application, wherein the schema configuration file defines a plurality of input features and a target variable to be generated for each item in a synthetic data set, wherein the schema configuration file includes feature characteristics for each of the plurality of input features, wherein the schema configuration file includes a set of one or more distribution parameters for a first input feature of the plurality of input features, wherein the schema configuration file includes a set of one or more correlations between the first input feature and the target variable for each item in the synthetic data set;
   generating, by the synthetic data generation system, a plurality of items for the synthetic data set based on the schema configuration file by performing the following for the plurality of items:
      generating synthetic data for the plurally of input features based on the feature characteristics and the set of one or more distribution parameters included in the schema configuration file;
      generating a set of one or more if-then else rules based at least on the set of one or more correlations, wherein the set of one or more if-then else rules express how the synthetic data generated for the first input feature should effect generation of synthetic data for the target variable; and
      generating synthetic data for the target variable based at least on the synthetic data generated for the first input feature and the set of one or more correlations between the first input feature and the target variable included in the schema configuration file, wherein the generating the synthetic data for the target variable includes applying at least one of the set of one or more if-then else rules; and
   training a machine learning model (ML) using the generated synthetic data.

9. The non-transitory machine-readable storage medium of claim 8, wherein each of the set of one or more correlations is expressed in the schema configuration file using a correlation type and a correlation strength, wherein the correlation type expresses an effect on synthetic data to be generated for the target variable, and wherein the correlation strength expresses a magnitude of the effect.

10. The non-transitory machine-readable storage medium of claim 8, the generating the synthetic data for the plurally of input features comprising:
 generating, based on one of the feature characteristics for at least one of the plurality of input features, the synthetic data using discrete probability distribution.

11. The non-transitory machine-readable storage medium of claim 8, providing further instructions that cause the set of one or more processors to perform operations comprising:
 building a set of one or more input to target relationships using the set of one or more correlations, wherein each of the set of one or more correlations includes a correlation type and correlation strength.

12. The non-transitory machine-readable storage medium of claim 8, providing further instructions that cause the set of one or more processors to perform operations comprising:
 generating the set of if-else rules from input to target relationships derived from the schema configuration file.

13. The non-transitory machine-readable storage medium of claim 12, wherein the set of if-else rules divide an input space into segments with respective distributions.

14. The non-transitory machine-readable storage medium of claim 13, the generating the synthetic data for the target variable comprising:
 generating the synthetic data per the respective.

15. An apparatus comprising:
 a set of one or more processors; and
 a non-transitory machine-readable storage medium that provides instructions that, when executed by the set of one or more processors, are configurable to cause the apparatus to perform operations comprising:
  receiving, at a synthetic data generation system, a schema configuration file in a synthetic data set request from a client application, wherein the schema configuration file defines a plurality of input features and a target variable to be generated for each item in a synthetic data set, wherein the schema configuration file includes feature characteristics for each of the plurality of input features, wherein the schema configuration file includes a set of one or more distribution parameters for a first input feature of the plurality of input features, wherein the schema configuration file includes a set of one or more correlations between the first input feature and the target variable for each item in the synthetic data set;
  generating, by the synthetic data generation system, a plurality of items for the synthetic data set based on the schema configuration file by performing the following for the plurality of items:
   generating synthetic data for the plurally of input features based on the feature characteristics and the set of one or more distribution parameters included in the schema configuration file;
   generating a set of one or more if-then else rules based at least on the set of one or more correlations, wherein the set of one or more if-then else rules express how the synthetic data generated for the first input feature should effect generation of synthetic data for the target variable; and
   generating synthetic data for the target variable based at least on the synthetic data generated for the first input feature and the set of one or more correlations between the first input feature and the target variable included in the schema configuration file, wherein the generating the synthetic data for the target variable includes applying at least one of the set of one or more if-then else rules; and
  training a machine learning model (ML) using the generated synthetic data.

16. The apparatus of claim 15, wherein each of the set of one or more correlations is expressed in the schema configuration files using a correlation type and a correlation strength, wherein the correlation type expresses an effect on synthetic data to be generated for the target variable, and wherein the correlation strength expresses a magnitude of the effect.

17. The apparatus of claim 15, the generating synthetic data for the plurally of input features comprising:
 generating, based on one of the feature characteristics for at least one of the plurality of input features, the synthetic data using discrete probability distribution.

18. The apparatus of claim 15, the non-transitory machine readable medium having further instructions that when executed cause the set of one or more processors to perform further operations comprising:
 building a set of one or more input to target relationships using the set of one or more correlations, wherein each of the set of one or more correlations includes a correlation type and correlation strength.

19. The apparatus of claim 15, the non-transitory machine readable medium having further instructions that when executed cause the set of one or more processors to perform further operations comprising:
 generating the set of if-else rules from input to target relationships derived from the schema configuration file.

20. The apparatus of claim 19, wherein
 the set of if-else rules divide an input space into segments with respective distributions.

21. The apparatus of claim 20, the generating the synthetic data for the target variable comprising:
 generating the synthetic data per the respective distributions.

* * * * *